R. E. CAMPBELL.

Mattress Frame.

No. 9,564. Reissued Feb. 15, 1881.

WITNESSES,

Arthur G. Morey,

John Pettibone

INVENTOR,

Robert E. Campbell,

By G. L. Chapin Atty.

N. PETERS, PHOTO-LITHOGRAPHER, WASHINGTON, D. C.

UNITED STATES PATENT OFFICE.

ROBERT E. CAMPBELL, OF SAN FRANCISCO, CALIFORNIA.

MATTRESS-FRAME.

SPECIFICATION forming part of Reissued Letters Patent No. 9,564, dated February 15, 1881.

Original No. 232,334, dated September 21, 1880. Application for reissue filed October 18, 1880.

*To all whom it may concern:*

Be it known that I, ROBERT E. CAMPBELL, of San Francisco, in the county of San Francisco and State of California, have invented new and useful Improvements in Mattress-Frames, of which the following is a specification, reference being had to the accompanying drawings, in which—

Figure 1:
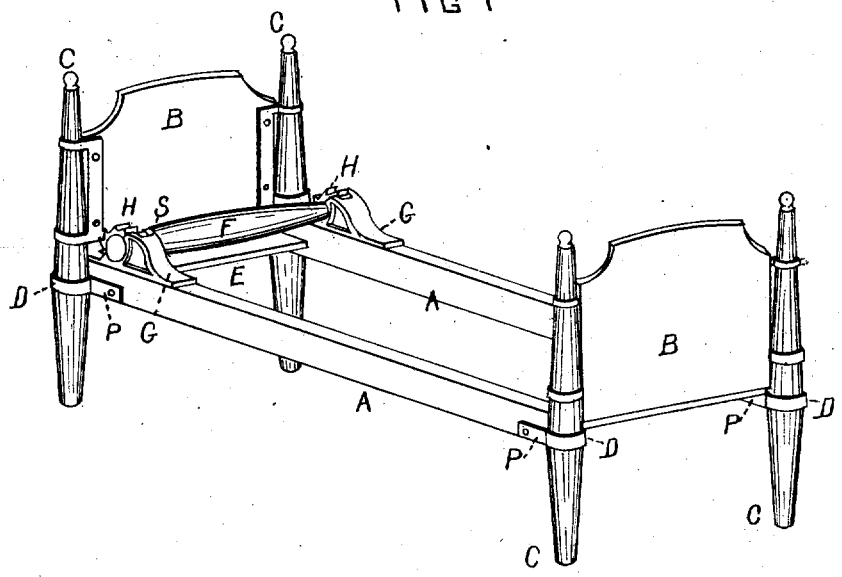
Figure 4:
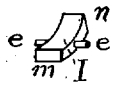
Figure 2:
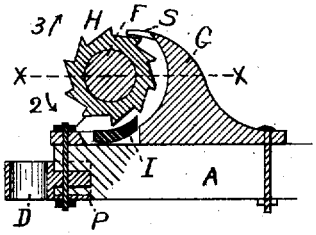
Figure 3:
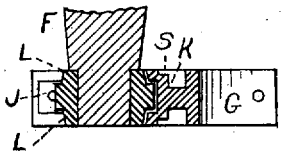
Figure 5:
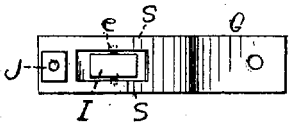

Figure 1 is a perspective representation of my improved mattress-frame attached to the posts of a bedstead; Fig. 2, a vertical section of the ratchet, taken longitudinally with the side rails of the mattress-frame; Fig. 3, a section of the ratchet and ratchet-stand, taken on line *x x*, Fig. 2; Fig. 4, a perspective representation of the pawl removed from the other parts; Fig. 5, a top view of the ratchet-stand.

The object of the present invention is to improve the bed-bottom patented to David W. Taylor on August 29, 1876, No. 181,605.

The nature of invention consists in the novel construction of the ratchet, ratchet-stand, and pawl, as combined with the swell-roller, to hold the latter in a fixed position after it has been turned to tighten the fabric which supports the bedding, and in cross-bars placed in the side rails below the rollers, to hold the roller-journals in position in their respective stands, in combination with single bolts at the corners of the mattress-frame to hold the parts together, as specified.

A A represent the side rails to the mattress-frame, and E E are the end bars. F is the same form of swell tension-rollers shown in said Letters Patent. G G represent what I term "ratchet-stands," which are in bracket form, and are formed on their concave edges with recesses K, to permit a free movement of the ratchets H. The margins of these recesses are inclined inward to form bearings to fit conical journals L on both sides of the ratchets H H. The function of bearings S S is to sustain the strain put on the roller F in stretching the fabric, and the object of beveling them inward is, that the conical bearings L L on the ratchet H may prevent such a longitudinal movement of the roller as would cause the ratchet to grind against the ratchet-stand. The inside prongs of the stand are formed on a line with the roller, that the wire fabric may extend to the ratchets H H.

A pawl, I, is fitted into a recess formed in the lower part of each stand G, and held in place by pivots *e e*. The end *n* of the pawl is fitted to engage the ratchet H, and the end *m* is weighted, so as to cause the end *n* to catch onto the ratchet when the roller is turned in the direction indicated by dart 3, and also to permit a free movement of the roller in the direction of dart 2.

The stands G, rails A, and cross-bars E are held together by bolts J, Fig. 2. Said bolts also pass through the shanks P P of the thimble-sockets D D and firmly unite the parts at each corner by a single bolt.

The advantage of this construction is the combination of the fewest possible pieces, a saving of material, and attaining strength by lessening the number of holes to receive fastenings. Further than this, provision is made for readily "taking down" the mattress-frame for shipment in compact form.

The cross-bars E extend into the side rails, A A, below the roller F, in a mattress-frame, in order to prevent the rails A from twisting, and thereby injuriously affecting the journals of the rollers F in their respective stands, and also strengthening the angles of the frame.

The thimble-sockets pass onto the posts C C and unite the mattress-frame with the other parts to form a complete bedstead; but this feature is not claimed in this application.

I claim and desire to secure by Letters Patent—

1. The ratchet-stand G G, recessed at K, and formed with beveled bearings S S, in combination with the ratchets H H, the conical journals L, located at the sides of the ratchet, and the weighted pawls I I, placed in recesses below the ratchets H H, the bolts J J, side rails, A A, and roller F, as and for the purpose specified.

2. The ratchet-stands G, side rails, A A, cross-bars E, and thimble-shanks P, in combination with the single bolts J, passing through them at each corner at the head of the mattress, and connecting them, as specified.

ROBERT E. CAMPBELL.

Witnesses:
A. G. MOREY,
JOHN PETTIBONE.